Figure 1:
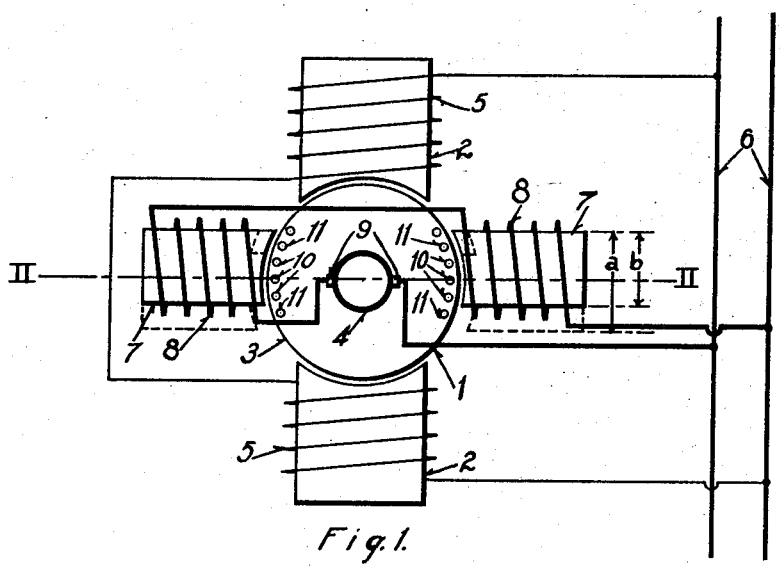

R. E. HELLMUND.
DYNAMO ELECTRIC MACHINE.
APPLICATION FILED JUNE 4, 1915.

1,275,916.

Patented Aug. 13, 1918.

WITNESSES:
A. J. Fitzgerald
O. W. Kennedy

INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,275,916. Specification of Letters Patent. Patented Aug. 13, 1918.

Application filed June 4, 1915. Serial No. 32,156.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Dynamo-Electric Machines, of which the following is a specification.

My invention relates to dynamo-electric machines and particularly to machines of the commutator type which are provided with commutating field-magnet windings carried by auxiliary polar projections disposed intermediate the main polar projections for the purpose of improving the commutating conditions during the operation of such machines.

The object of my invention is to provide an arrangement of the commutating or interpolar projections whereby their proper corrective effect may be produced, with the utilization of a minimum amount of magnetic material in the construction of the interpolar projections.

In the operation of direct-current machines, it is a well known fact that sparking at the brushes is primarily due to the local magnetic field that surrounds an armature coil undergoing commutation. This magnetic field generates an electromotive force in the commutated coil in such a way as to oppose the reversal of current in the coil and thus tends to cause sparking as the corresponding commutating bars leave the brushes. For this reason, commutating poles are provided intermediate the main field-magnet poles and within the zone of commutation. Such interpolar projections have their field-magnet windings in series-circuit relation with the armature and produce a magnetic field which neutralizes the effect of the local magnetic field produced by the armature current and also generate, in the commutated coil, an electromotive force which tends to assist the reversal of the current. Since the commutating field-magnet windings are in series-circuit relation with the armature, the magnetic field produced by the commutating poles varies directly in proportion to the load and, therefore, has the proper corrective effect at all loads.

In the construction of dynamo-electric machines provided with commutating poles, the interpolar projections are usually arranged with their central axes coinciding with the axes of commutation or neutral axes of the armature winding and symmetrical with respect to the same. It has been found desirable to have the faces of interpolar projections cover as great a portion of the zone of commutation as may be allowable by reason of the clearances between the field-magnet coils carried by the main polar projections. It has also been found desirable to have the maximum values of electromotive force due to the commutating poles occur exactly in the center of the zone of commutation and to have reduced values of electromotive force on either side thereof. As the values of electromotive force, due to the commutating poles, are necessarily small, this so-called "shading" effect may be produced by increasing the air gap at the extremities of the pole faces. However, such a form of interpolar projection is considerably more expensive to construct than one of uniform dimensions.

By my invention, I propose to provide an arrangement of the interpolar projections whereby a commutating field of varying strength may be produced with a commutating pole piece of uniform dimensions.

Figure 2:
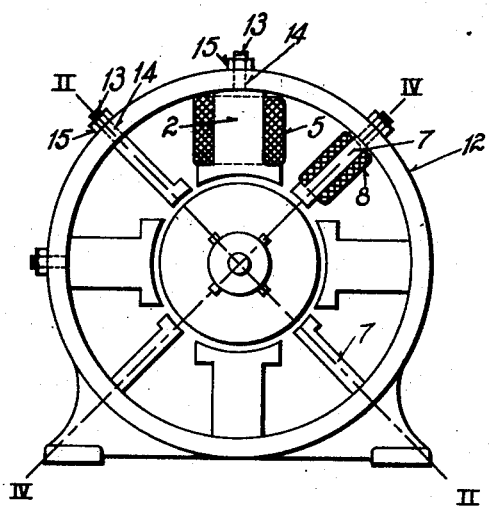

In the accompanying drawings, Figure 1 is a diagrammatic view of a dynamo-electric machine embodying my invention; and Fig. 2 is a side elevational view of a dynamo-electric machine embodying a modification of my invention.

Referring particularly to Fig. 1, a dynamo-electric machine 1 of the commutator type comprises a plurality of main polar projections 2, an armature member 3 and a commutator cylinder 4. The main polar projections 2 are provided with a plurality of field-magnet windings 5 connected across suitable direct-current mains 6. The dynamo-electric machine 1 is further provided with a plurality of interpolar projections 7 which carry field magnet windings 8 connected in series-circuit relation with the commutator cylinder 4 through the brushes 9 and across the direct-current mains 6. The winding, carried by the armature member 3, is connected to the commutator cylinder 4 in the usual manner, and the plane of commutation thereof is represented by the line II—II. The interpolar projections 7 are similarly asymmetric about plane II—II, that is, there is a preponderance of magnetic material on the upper side of the plane II—II. The interpolar projections 7 are of uniform dimensions and are so arranged that there is a uniform air gap between the armature member 3 and the faces of the interpolar projections 7.

With the above-described arrangement, the magnetic conditions within the machine are as follows. Each of the armature coils that comprise the diametrically opposite conductors 10 has a certain value of electromotive force E induced therein by the magnetic field produced by the commutating poles 7. The armature coils that comprise the conductors 11, however, have induced therein a value of electromotive force $\frac{E}{2}$ because only those conductors 11 that are above the plane of commutation II—II are within the magnetic field of the commutating poles 7. Thus, it may be seen that the effect of "shaded" interpolar faces is obtained by having the interpoles similarly asymmetric about the plane of communication II—II.

The usual arrangement of interpolar projections, in order to secure the above-described result, is shown by dotted lines and it is apparent from a consideration of the same that the arrangement proposed in accordance with my invention allows the magnetic effect of an interpolar projection having the width "*a*" to be obtained by the use of an interpolar projection having the actual width "*b*".

In Fig. 2 is shown a modification of my invention in which a portion of one side of each interpolar projection is cut away in order to allow greater clearances between the main field-magnet windings 5 and the commutating field-magnet windings 8, respectively. The planes of commutation are represented by the lines II—II and IV—IV, respectively, and, with this arrangement, the magnetic effects are substantially the same as described with reference to Fig. 1. The main polar projections 2 and the interpolar projections 7 are adapted to be secured to the field-magnet yoke 12 of the dynamo-electric machine 1 by means of suitable bolts 13 carried by the polar projections and extending through openings 14 in the field-magnet yoke 12 and the coacting nuts 15.

From the foregoing, it is apparent that, with interpolar projections arranged in accordance with my invention, a considerable saving in magnetic material and labor may be effected as well as a saving in the copper forming the field magnet windings.

While I have shown my invention in a simple and preferred form, it is not limited to the specific structure described but is susceptible of various modifications within the scope of the appended claims.

I claim as my invention:

1. In a dynamo-electric machine, the combination with a plurality of equi-spaced exciting field poles, of a like number of interpoles interposed therebetween, respectively, a portion of said interpoles being angularly displaced from the mid-position, determined by the immediately adjacent exciting poles, in one direction and the remaining interpoles being similarly displaced in the other direction.

2. In a dynamo-electric machine, the combination with a plurality of equi-spaced exciting field poles, of a like number of interpoles interposed therebetween, respectively, alternate interpoles being angularly displaced from the mid-position, determined by the immediately adjacent exciting poles, in one direction and the remaining interpoles being similarly displaced in the other direction.

3. In a dynamo-electric machine, the combination with a plurality of equi-spaced exciting field poles, of a like number of interpoles interposed therebetween, respectively, a portion of each of certain of said interpoles being angularly displaced from the mid-position, determined by the immediately adjacent exciting poles, in one direction, and corresponding portions of the remaining interpoles being similarly displaced in the opposite direction.

4. In a dynamo-electric machine, the combination with a plurality of equi-spaced exciting field poles, of a like number of interpoles interposed therebetween, respectively, a portion of each of alternate interpoles being angularly displaced from the mid-position, determined by the immediately adjacent exciting poles, in one direction, and corresponding portions of the remaining interpoles being similarly displaced in the opposite direction.

5. A dynamo-electric machine of the commutator type comprising a plurality of main polar projections and a plurality of interpolar projections, the diametrically opposite interpolar projections being asymmetric about the corresponding plane of commutation and symmetric about a plane that is perpendicular to the said plane of commutation.

6. A dynamo-electric machine of the commutator type comprising a plurality of main polar projections and a plurality of interpolar projections, the diametrically opposite interpolar projections having a preponderance of magnetic material on one side of the corresponding plane of commutation.

In testimony whereof, I have hereunto subscribed my name this 27th day of May, 1915.

RUDOLF E. HELLMUND.

Copies of this patent may be obtained for five cents each, by addressing the "Commissioner of Patents, Washington, D. C."